US012677043B2

(12) United States Patent
Liu et al.

(10) Patent No.: US 12,677,043 B2
(45) Date of Patent: Jul. 7, 2026

(54) VIDEO PROCESSING METHOD AND APPARATUS, AND DEVICE AND STORAGE MEDIUM

(71) Applicant: Beijing Zitiao Network Technology Co., Ltd., Beijing (CN)

(72) Inventors: Xu Liu, Beijing (CN); Wentao Ruan, Beijing (CN); Xiangyu Gao, Beijing (CN); Shuai Han, Beijing (CN); Qiang Huang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/901,983

(22) Filed: Sep. 30, 2024

(65) Prior Publication Data

US 2025/0024111 A1 Jan. 16, 2025

Related U.S. Application Data

(63) Continuation of application No. PCT/CN2023/081041, filed on Mar. 13, 2023.

(30) Foreign Application Priority Data

Mar. 30, 2022 (CN) .......................... 202210332008.2

(51) Int. Cl.
*H04N 21/482* (2011.01)
(52) U.S. Cl.
CPC ................................. *H04N 21/482* (2013.01)
(58) Field of Classification Search
None
See application file for complete search history.

(56) References Cited

U.S. PATENT DOCUMENTS

2007/0288963 A1* 12/2007 Ahmad-Taylor ............................
H04N 21/4826
725/35
2008/0288461 A1* 11/2008 Glennon ............ H04N 21/4788
(Continued)

FOREIGN PATENT DOCUMENTS

CN 103916718 A 7/2014
CN 111510784 A 8/2020
(Continued)

OTHER PUBLICATIONS

International Search Report and Written Opinion received for PCT Patent Application No. PCT/CN2023/081041, mailed on May 12, 2023, 7 pages (3 pages of English Translation and 4 pages of Original Document).
(Continued)

*Primary Examiner* — Rong Le

(57) ABSTRACT

Provided in the present disclosure are a video processing method and apparatus, and a device and a storage medium. The video processing method comprises: firstly, displaying a preset video switching control on a video playback page for a target video, wherein the target video belongs to a first video set and a first video information flow; on the basis of a trigger operation for the preset video switching control, determining a target switching video from the first video set; then, replacing the target video in the first video information flow with the target switching video, so as to obtain a video information flow which has been subjected to replacement and which corresponds to the first video information flow; and then, on the basis of the video information flow which has been subjected to replacement, playing the target switching video on the video playback page.

15 Claims, 5 Drawing Sheets

(56)          References Cited

U.S. PATENT DOCUMENTS

| | | | |
|---|---|---|---|
| 2011/0106744 A1* | 5/2011 | Becker | H04N 21/44224 |
| | | | 706/46 |
| 2021/0099751 A1 | 4/2021 | Li et al. | |
| 2021/0306711 A1* | 9/2021 | Ellingford | H04N 21/6125 |
| 2023/0140948 A1 | 5/2023 | Li et al. | |

FOREIGN PATENT DOCUMENTS

| | | | |
|---|---|---|---|
| CN | 111767221 A | 10/2020 | |
| CN | 111770384 A | 10/2020 | |
| CN | 112423122 A | 2/2021 | |
| CN | 112632322 A | 4/2021 | |
| CN | 112752117 A | 5/2021 | |
| CN | 112929725 A | 6/2021 | |
| CN | 112954440 A | 6/2021 | |
| CN | 113238828 A | 8/2021 | |
| CN | 113411659 A | * | 9/2021 |
| CN | 113645496 A | 11/2021 | |
| CN | 114051160 A | 2/2022 | |
| CN | 114201705 A | 3/2022 | |
| CN | 114697752 A | 7/2022 | |
| WO | 2021/008943 A1 | 1/2021 | |

OTHER PUBLICATIONS

Office action received from Chinese patent application No. 202210332008.2 mailed on Jan. 4, 2023, 14 pages (7 pages English Translation and 7 pages Original Copy).
Office action received from Chinese patent application No. 202210332008.2 mailed on Oct. 20, 2022, 16 pages (8 pages English Translation and 8 pages Original Copy).
European Search Report for EP Patent Application No. 23777809.7, Issued on Apr. 4, 2025, 10 pages.

* cited by examiner

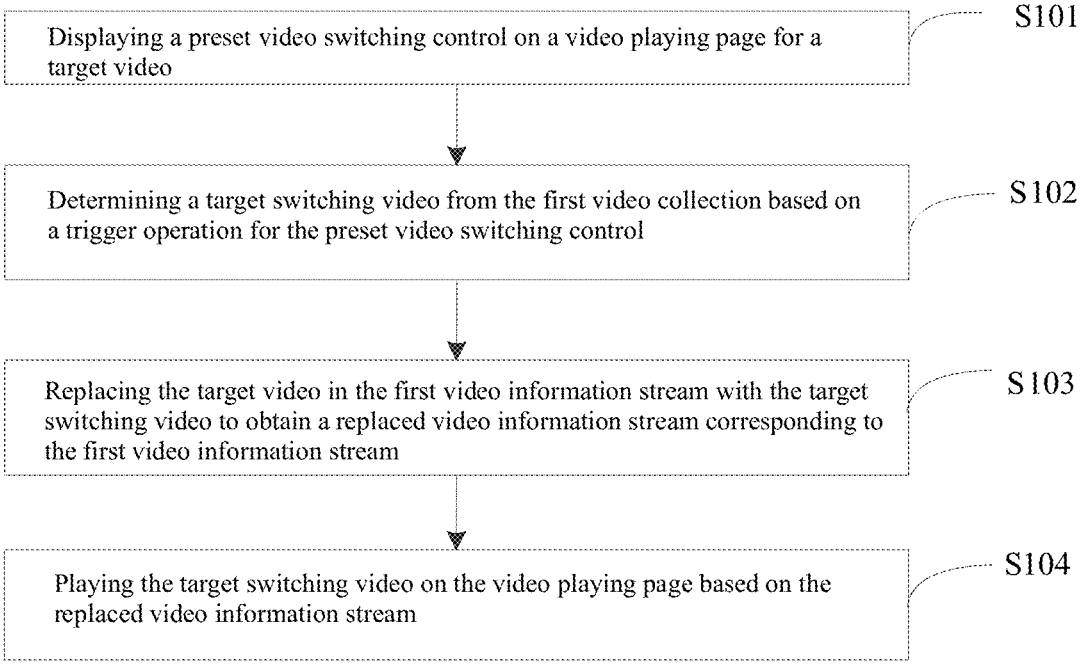

Displaying a preset video switching control on a video playing page for a target video          S101

Determining a target switching video from the first video collection based on a trigger operation for the preset video switching control          S102

Replacing the target video in the first video information stream with the target switching video to obtain a replaced video information stream corresponding to the first video information stream          S103

Playing the target switching video on the video playing page based on the replaced video information stream          S104

Figure 1

VIDEO PROCESSING METHOD AND APPARATUS, AND DEVICE AND STORAGE MEDIUM

CROSS-REFERENCE TO RELATED APPLICATIONS

The present application is a continuation of International Application No. PCT/CN2023/081041, filed on Mar. 13, 2023, which is based on and claims priority to Chinese Patent Application No. 202210332008.2 filed on Mar. 30, 2022, the disclosures of both applications are incorporated by reference herein in their entireties.

TECHNICAL FIELD

The present disclosure relates to the field of data processing, and in particular to a video processing method, apparatus, device, and storage medium.

BACKGROUND

A video collection refers to a collection including a plurality of videos, such as a video collection of a television series, a video collection with related content taken by the same creator, and so on.

SUMMARY

Embodiments of the present disclosure provide a video processing method to achieve an improvement to the prior art.

In a first aspect, the present disclosure provides a video processing method, the method comprising:

displaying a preset video switching control on a video playing page for a target video, wherein the target video belongs to a first video collection and a first video information stream;

determining a target switching video from the first video collection based on a trigger operation for the preset video switching control;

replacing the target video in the first video information stream with the target switching video to obtain a replaced video information stream corresponding to the first video information stream;

playing the target switching video on the video playing page based on the replaced video information stream, wherein the videos in the replaced video information stream are able to be switched through a preset slide operation triggered on the video playing page.

In an alternative embodiment, the preset video switching control includes a next episode switching control, and the determining a target switching video from the first video collection based on a trigger operation for the preset video switching control includes:

in response to a trigger operation for the next episode switching control, determining a next video adjacent to the target video in the first video collection as the target switching video.

In an alternative embodiment, the preset video switching control includes an episode selection switching control, and the determining a target switching video from the first video collection based on a trigger operation for the preset video switching control includes:

in response to a trigger operation for the episode selection switching control, displaying a video list corresponding to the first video collection on the video playing page, wherein the video list is used for presenting information of videos in the first video collection based on a playing order;

in response to a trigger operation for any video in the video list, determining a video corresponding to the trigger operation as the target switching video.

In an alternative embodiment, after the playing the target switching video on the video playing page based on the replaced video information stream, the method further comprises:

in response to a preset switch-back operation for the target switching video, in the replaced video information stream, determining a previous video adjacent to the target switching video as a target switch-back video;

playing the target switch-back video on the video playing page.

In an alternative embodiment, after the playing the target switching video on the video playing page based on the replaced video information stream, the method further comprises:

in response to a preset switch-forward operation for the target switching video, in the replaced video information stream, determining a next video adjacent to the target switching video as a target switch-forward video;

playing the target switch-forward video on the video playing page.

In an alternative embodiment, before the displaying a preset video switching control on a video playing page for a target video, the method further comprises:

in response to a preload trigger operation for the first video information stream, preloading videos in the first video collection, to which the target video in the first video information stream belongs.

In a second aspect, the present disclosure provides a video processing apparatus, the apparatus comprising:

a first display module for displaying a preset video switching control on a video playing page for a target video, wherein the target video belongs to a first video collection and a first video information stream;

a first determination module for determining a target switching video from the first video collection based on a trigger operation for the preset video switching control;

a replacement module for replacing the target video in the first video information stream with the target switching video to obtain a replaced video information stream corresponding to the first video information stream;

a first play module for playing the target switching video on the video playing page based on the replaced video information stream, wherein the videos in the replaced video information stream are able to be switched through a preset slide operation triggered on the video playing page.

In a third aspect, the present disclosure provides a computer readable storage medium having stored therein instructions which, when being executed on a terminal device, cause the terminal device to implement the above-mentioned method.

In a fourth aspect, the present disclosure provides a video processing device, comprising: a memory, a processor, and a computer program stored on the memory and executable on the processor, the processor implementing the above-mentioned method when executing the computer program.

In a fifth aspect, the present disclosure provides a computer program product comprising a computer program/instructions which, when being executed by a processor, implement the above-mentioned method.

Compared with the related art, the technical solution as provided in the embodiment of the present disclosure has at least the following advantages:

the embodiment of the disclosure provides a video processing method, comprising: firstly, displaying a preset video switching control on a video playing page for a target video, wherein the target video belongs to a first video collection and a first video information stream; secondly, determining a target switching video from the first video collection based on a trigger operation for the preset video switching control; and then replacing the target video in the first video information stream with the target switching video to obtain a replaced video information stream corresponding to the first video information stream. Further, playing the target switching video on the video playing page based on the replaced video information stream, wherein the videos in the replaced video information stream are able to be switched through a preset slide operation triggered on the video playing page.

BRIEF DESCRIPTION OF THE DRAWINGS

The accompanying drawings, which are incorporated in and constitute a part of this specification, illustrate embodiments consistent with the present disclosure and, together with the description, serve to explain the principles of the disclosure.

In order to more clearly illustrate the embodiments of the present disclosure or technical solutions in the related art, the drawings used in the description of the embodiments or related technologies will be briefly described below, and it is obvious for those skilled in the art to obtain other drawings from these drawings without inventive effort.

FIG. 1 is a flow diagram of a video processing method as provided in an embodiment of the present disclosure;

DETAILED DESCRIPTION

Figure 2:
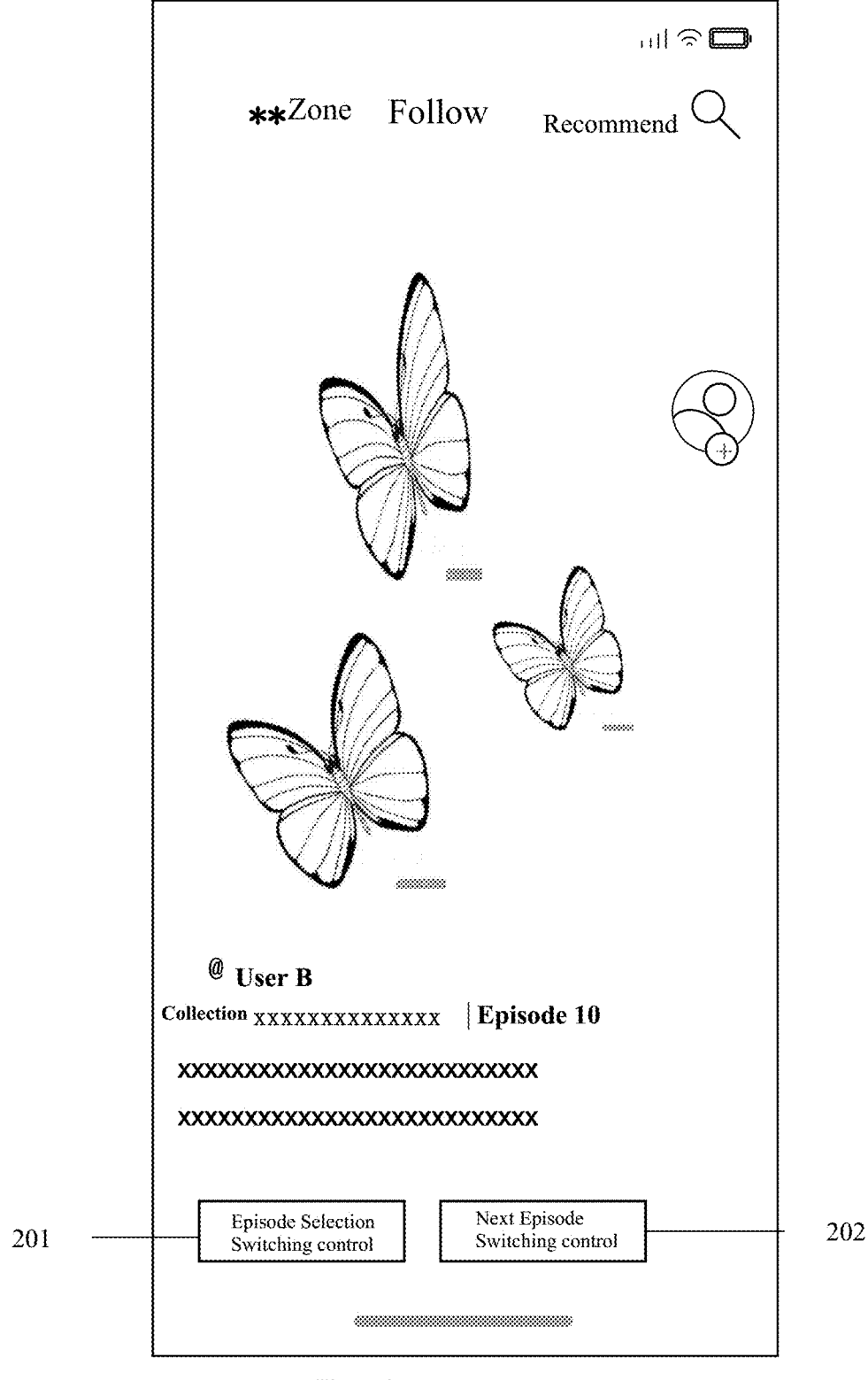
FIG. 2 is a schematic diagram of a video playing page as provided in an embodiment of the present disclosure.

In order that the above objects, features and advantages of the present disclosure can be more clearly understood, solutions of the present disclosure will be further described below. It should be noted that, in the case of no conflict, the embodiments and features in the embodiments of the present disclosure can be combined with each other.

In the following description, numerous specific details are set forth in order to provide a thorough understanding of the present disclosure, but the present disclosure can be practiced otherwise than as described herein. Obviously, the embodiments in the specification are only part of the embodiments of the present disclosure, and not all embodiments.

At present, in a scene for consuming a video collection, by recommending videos in the video collection for a user on a video recommendation page, consumption of the videos in the video collection is realized. If the user is interested in other videos in the video collection to which the recommended video belongs, he or she can trigger an inner stream to enter the video collection and carry out deep consumption on each video in the video collection. After the consumption for the video collection is completed, it is necessary to return to the video recommendation page again to continue to consume the videos in the video recommendation stream. Therefore, a path for consuming the video collection in the above scene is complex, and the user has to jump to different video playing pages and switch playing between different video streams, which influences the user's experience for video playing.

In order to simplify the path for consuming a video collection, the embodiment of the present disclosure provides a video processing method, so as to simplify the path for consuming videos in the video collection and improve the user's experience for video playing.

Firstly, a preset video switching control is displayed on a video playing page for a target video, wherein the target video belongs to a first video collection and a first video information stream. Secondly, a target switching video is determined from the first video collection based on a trigger operation for the preset video switching control; and then the target video in the first video information stream is replaced with the target switching video to obtain a replaced video information stream corresponding to the first video information stream. Further, the target switching video is played on the video playing page based on the replaced video information stream, wherein the videos in the replaced video information stream are able to be switched through a preset slide operation triggered on the video playing page. By means of providing a video switching control on the video playing page and replacing the video in the first video information stream with the target switching video, the embodiment of the present disclosure realizes the video playing based on the same video stream, simplifies the path for consuming the videos in the video collection, and improves the user's experience for video playing.

Based on this, an embodiment of the present disclosure provides a video processing method, and with reference to FIG. 1, a flow diagram of a video processing method as provided in the embodiment of the present disclosure is shown, the method comprising:

Step S101: displaying a preset video switching control on a video playing page for a target video.

The target video belongs to a first video collection and a first video information stream.

In the embodiment of the present disclosure, the target video belongs to both of a first video collection and a first video information stream. The first video collection can include a plurality of videos having a playing order, and the target video can be any video in the first video collection. The first video information stream can be a preset type of video information stream, wherein the target video also belongs to the first video information stream, and the preset type of video information stream can include a recommended video stream, a followed video stream, a video stream corresponding to a positioning region, and the like. An introduction is made below by taking the first video information stream as the recommended video stream as an example.

In the embodiment of the disclosure, in a process of playing a video based on a first video information stream, a preset video switching control is displayed on a video playing page for a target video, and is used for triggering a switch operation for videos in a first video collection.

In an alternative embodiment, the preset video switching control can include a next episode switching control for triggering a switch operation for the next video episode of the target video as located in the first video collection.

In addition, the preset video switching control can further include an episode selection switching control for triggering a switch operation for any video in the first video collection.

Referring to FIG. 2, a schematic diagram of a video playing page as provided in the embodiment of the present disclosure is shown, wherein an episode selection switching control 201 and a next episode switching control 202 are displayed on the video playing page.

Step S102: determining a target switching video from the first video collection based on a trigger operation for the preset video switching control.

In the embodiment of the present disclosure, the trigger operation for the preset video switching control displayed on the video playing page can be a click operation for the preset video switching control. When the trigger operation for the preset video switching control displayed on the video playing page is received, a target switching video can be determined from a first video collection to which the target video belongs.

In an alternative embodiment, when a trigger operation for the next episode switching control 202 displayed on the video playing page is received, a next video adjacent to the target video in the first video collection to which the target video belongs is determined as the target switching video.

In another alternative embodiment, when a trigger operation for the episode selection switching control 201 displayed on the video playing page is received, a video list corresponding to the first video collection, to which the target video belongs, is displayed on the video playing page. The video list is used for presenting information of each video in the first video collection based on the playing order, such as video duration, video name, video author, video cover and the like. When a trigger operation for any video in the video list is received, a video corresponding to the trigger operation is determined as the target switching video.

Figure 3:
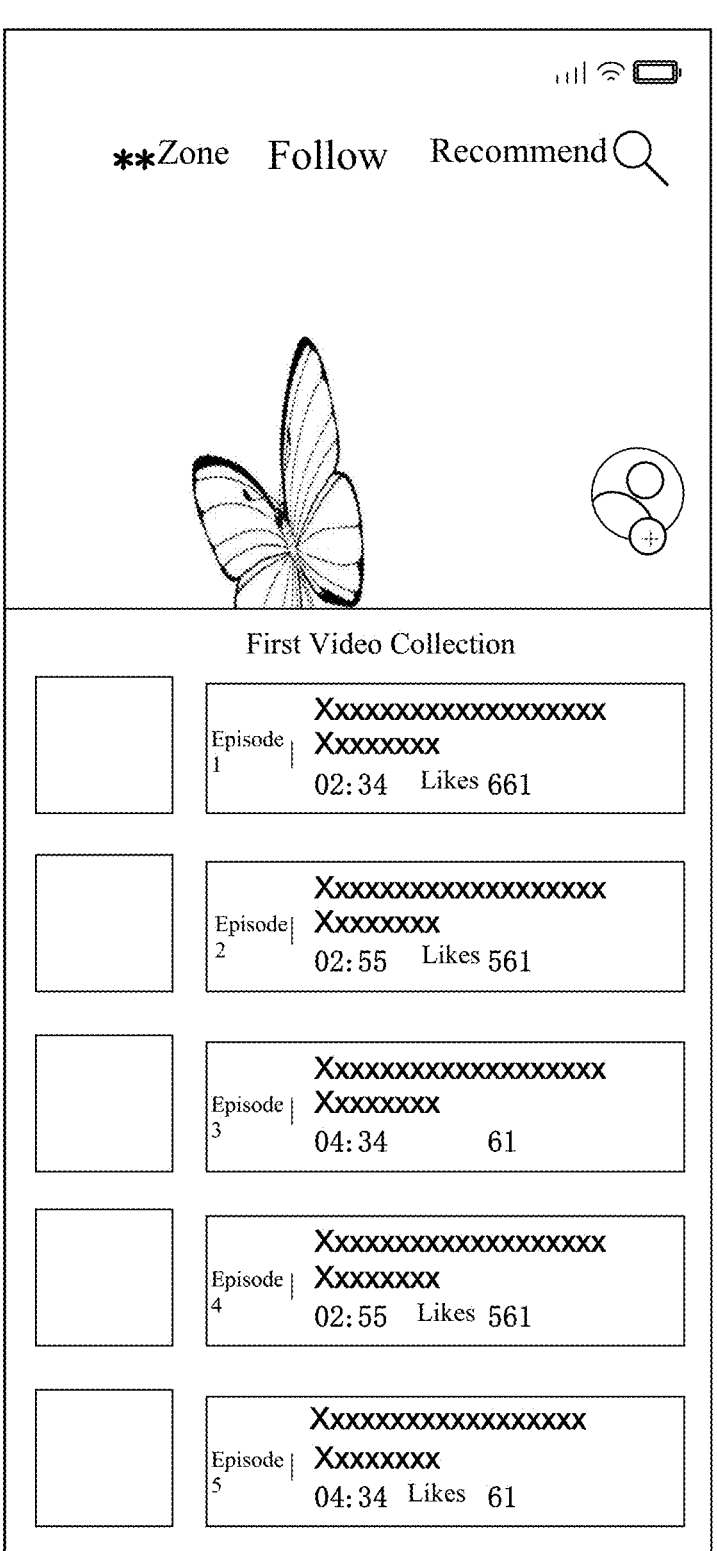
FIG. 3 is a schematic diagram of another video playing page as provided in an embodiment of the present disclosure.

As shown in FIG. 3, a schematic diagram of another video playing page as provided in the embodiment of the present disclosure is shown. When a trigger operation for the episode selection switching control 201 displayed on the video playing page is received, a video list corresponding to a first video collection is displayed on the video playing page. Assuming that a trigger operation for a video in the video list is received, the video is determined as the target switching video.

Step S103: replacing the target video in the first video information stream with the target switching video to obtain a replaced video information stream corresponding to the first video information stream.

In the embodiment of the present disclosure, after the target switching video is determined, the target video in the first video information stream is replaced with the target switching video, that is, the target switching video is inserted into a position in the first video information stream where the target video is located, and the target video is deleted, so that the replaced video information stream corresponding to the first video information stream is obtained.

In an alternative embodiment, the first video information stream can be preloaded based on a preloading strategy to obtain the first video information stream. In order to increase the speed for responding to the user's trigger operation for the preset video switching control, videos in a video collection, to which the video in the first video information stream belongs, can be preloaded simultaneously in the process of preloading the first video information stream.

Specifically, in response to the preload trigger operation for the first video information stream, videos in the first video collection, to which the target video in the first video information stream belongs, are preloaded. The preload trigger operation for the first video information stream can be an operation for triggering preload of the first video information stream, for example, it can be a pull-down operation or the like triggered on the video playing page.

Assuming that the first video information stream is a recommended video stream, and the recommended video stream is preloaded based on a preloading strategy to obtain the recommended video stream in the process of playing a video on a recommended page. In order to increase the speed for responding to a user's trigger operation for the preset video switching control, videos in a video collection, to which the video in the recommended video stream belongs, can be preloaded in the process of preloading the recommended video stream.

In practical applications, after a target switching video is determined from a first video collection which is obtained by preloading, the target video in the first video information stream which is obtained by preloading is replaced with the target switching video, to obtain a replaced video information stream corresponding to the first video information stream.

Step S104: playing the target switching video on the video playing page based on the replaced video information stream.

The videos in the replaced video information stream are able to be switched through a preset slide operation triggered on the video playing page.

In the embodiment of the present disclosure, after the replaced video information stream is obtained, the target switching video in the replaced video information stream is played on the video playing page corresponding to the target video. Specifically, the target switching video is played based on the replaced video information stream. Through the preset slide operation triggered on the video playing page, the video currently played on the video playing page can be switched based on the video in the replaced video information stream. The preset slide operation includes an upward slide operation and a downward slide operation.

In an alternative embodiment, in response to a preset switch-back operation for the target switching video, in the replaced video information stream, a previous video adjacent to the target switching video is determined as the target switch-back video, and then the target switch-back video is played on the video playing page. The preset switch-back operation can be an upward slide operation triggered on the video playing page corresponding to the target switching video, and the preset switch-back operation can also be other types of operation, which is not limited in this embodiment of the present disclosure.

In another alternative embodiment, in response to a preset switch-forward operation for the target switching video, in the replaced video information stream, a next video adjacent to the target switching video is determined as the target switch-forward video, and then the target switch-forward video is played on the video playing page. The preset switch-forward operation can be a downward slide operation triggered on the video playing page corresponding to the target switching video, and the preset switch-forward operation can also be other types of operation, which is not limited in this embodiment of the present disclosure.

In the video processing method as provided in the embodiment of the present disclosure, firstly, the preset video switching control is displayed on the video playing page for a target video, wherein the target video belongs to the first video collection and the first video information stream, and the first video information stream is a preset type of video information stream. Secondly, a target switching video is determined from the first video collection based on a trigger operation for the preset video switching control; and then the target video in the first video information stream is replaced with the target switching video to obtain a replaced video information stream corresponding to the first video information stream. Further, the target switching video is played on the video playing page based on the replaced video information stream. By means of providing a video switching control on the video playing page and replacing the video in the first video information stream with the target switching video, the embodiment of the present disclosure realizes the video playing based on the same video stream, simplifies the path for consuming videos in the video collection, and improves the user's experience for video playing.

Figure 4:
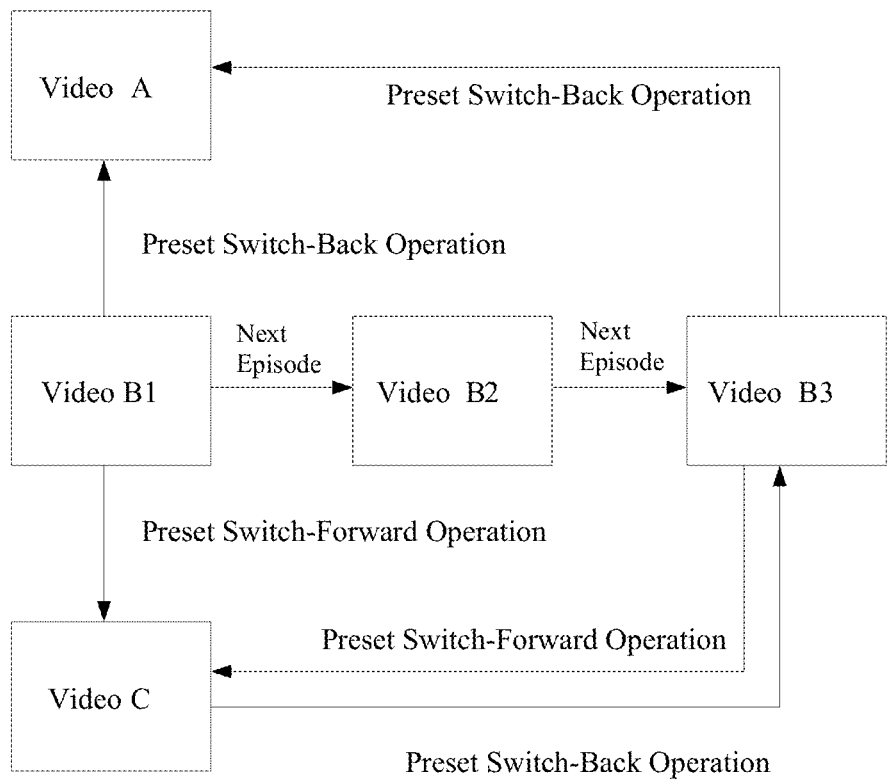
FIG. 4 is a schematic diagram of implementation of a video processing method as provided in an embodiment of the present disclosure.

Based on the above-mentioned embodiment, the present disclosure provides an application scene of the video processing method, and as shown in FIG. 4, a schematic diagram of performing a video processing method as provided in the embodiment of the present disclosure is shown. Assuming that a target video is a collection video B1, the collection video B1 belongs to a first video collection at least including collection videos B1, B2, and B3 in a playing order, and at the same time, the collection video B1 also belongs to a recommended video stream at least including videos A, B1 and C in a playing order.

In practical applications, in the process of playing videos based on a recommended video stream, when the collection video B1 is played on the video playing page, a next episode switching control and an episode selection switching control are displayed on the video playing page, as shown in FIG. 2.

When a trigger operation for the next episode switching control displayed on the video playing page is received, the next collection video adjacent to the collection video B1 in the first video collection, namely, the collection video B2, is determined as the target switching video. The collection video B1 in the recommended video stream is replaced with the collection video B2 to obtain a replaced recommended video stream corresponding to the recommended video stream, wherein the replaced recommended video stream includes the video A, the collection video B2 and the video C in the playing order. The collection video B2 is then played on the video playing page based on the replaced recommended video stream.

In the process of playing the collection video B2, since the collection video B2 belongs to the video collection, a next episode switching control and an episode selection switching control are displayed on the video playing page for the collection video B2, and if a trigger operation for the next episode switching control is received, then a next collection video adjacent to the collection video B2 in the first video collection, namely the collection video B3, is determined as the target switching video. The collection video B2 in the recommended video stream is replaced with the collection video B3 to obtain a replaced recommended video stream corresponding to the recommended video stream, wherein the replaced recommended video stream includes the video A, the collection video B3 and the video C in the playing order. Then the collection video B3 is played on the video playing page based on the replaced recommended video stream.

In an alternative embodiment, if a preset switch-back operation for the collection video B3 is received, then a previous video adjacent to the collection video B3 in the replaced recommended video stream, namely the video A, is determined as the target switch-back video, and the video A is played on the video playing page. At this time, on the video playing page of the video A, if a preset switch-forward operation is received, then a next video adjacent to the video A in the replaced recommended video stream, namely the collection video B3, is determined as the target switch-forward video, and the collection video B3 is played on the video playing page.

Based on the above-mentioned embodiment, it can be understood that, in the embodiment of the present disclosure, the switch operation for the target video in the first video information stream is realized based on the videos in the first video collection to which the target video belongs. Only one video exists between the video A and the video C in the first video information stream, and this video belongs to the first video collection.

It should be noted that, in the embodiment of the present disclosure, processing logic for a trigger operation for the episode selection switching control displayed on the video playing page can be understood with reference to the above-mentioned embodiment, and details are not described here again.

In the video processing method as provided in the embodiment of the present disclosure, in the scene for consuming a video collection, to which the target video in the recommended video stream belongs, it is unnecessary to enter the inner stream of the video collection. Instead, by means of replacing the target video in the recommended video stream, playing of the videos in the video collection is realized based on the replaced recommended video stream, which simplifies a path for consuming the videos in the video collection and improves the user's experience for video playing.

Figure 5:
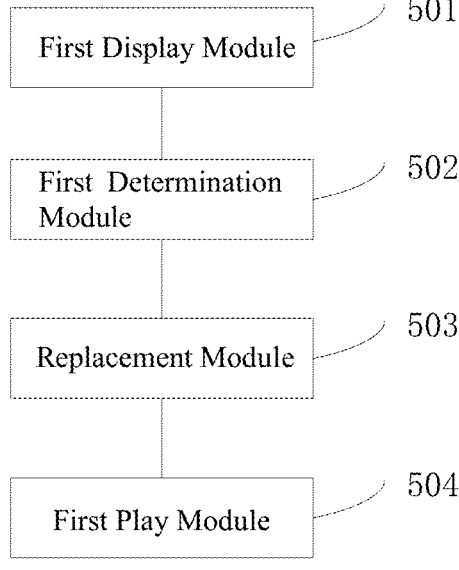
FIG. 5 is a schematic structural diagram of a video processing apparatus as provided in an embodiment of the present disclosure.

Based on the above-mentioned method embodiment, the present disclosure further provides a video processing apparatus, and referring to FIG. 5, a schematic structural diagram of a video processing apparatus as provided in the embodiment of the present disclosure is shown, the apparatus comprising:

a first display module 501 for displaying a preset video switching control on a video playing page for a target video, wherein the target video belongs to a first video collection and a first video information stream;

a first determination module 502 for determining a target switching video from the first video collection based on a trigger operation for the preset video switching control;

a replacement module 503 for replacing the target video in the first video information stream with the target switching video to obtain a replaced video information stream corresponding to the first video information stream;

a first play module 504 for playing the target switching video on the video playing page based on the replaced video information stream, wherein the videos in the replaced video information stream are able to be switched through a preset slide operation triggered on the video playing page.

In an alternative embodiment, the preset video switching control includes a next episode switching control, and the replacement module includes:

a first determination sub-module for determining, in response to a trigger operation for the next episode switching control, a next video adjacent to the target video in the first video collection as a target switching video.

In an alternative embodiment, the preset video switching control includes an episode selection switching control, and the replacement module includes:

a display sub-module, for displaying, in response to the trigger operation for the episode selection switching control, a video list corresponding to the first video collection on the video playing page, wherein the video list is used for presenting information of videos in the first video collection based on a playing order;

a second determination sub-module for determining, in response to the trigger operation for any video in the video list, the video corresponding to the trigger operation as the target switching video.

In an alternative embodiment, the apparatus further comprises:

a second determination module for determining, in response to a preset switch-back operation for the target switching video, a previous video adjacent to the target switching video in the replaced video information stream as a target switch-back video;

a second play module for playing the target switch-back video on the video playing page.

In an alternative embodiment, the apparatus further comprises:

a third determination module for determining, in response to a preset switch-forward operation for the target switching video, a next video adjacent to the target switching video in the replaced video information stream as a target switch-forward video;

a third play module for playing the target switch-forward video on the video playing page.

In an alternative embodiment, the apparatus further comprises:

a preload module for preloading, in response to a preload trigger operation for the first video information stream, videos in the first video collection, to which the target video in the first video information stream belongs.

In the video processing apparatus as provided in the embodiment of the present disclosure, firstly, a preset video switching control is displayed on a video playing page for a target video, wherein the target video belongs to a first video collection and a first video information stream; secondly, a target switching video is determined from the first video collection based on a trigger operation for the preset video switching control; and then the target video in the first video information stream is replaced with the target switching video to obtain a replaced video information stream corresponding to the first video information stream. Further, the target switching video is played on the video playing page based on the replaced video information stream, wherein the videos in the replaced video information stream are able to be switched through a preset slide operation triggered on the video playing page. By means of providing a video switching control on the video playing page and replacing the video in the first video information stream with the target switching video, the embodiment of the present disclosure realizes the video playing based on the same video stream, simplifies the path for consuming the videos in the video collection, and improves the user's experience for video playing.

In addition to the above-mentioned method and apparatus, an embodiment of the present disclosure further provides a computer readable storage medium having stored therein instructions that, when being executed on a terminal device, cause the terminal device to implement the video processing method as set forth in the embodiment of the present disclosure.

The embodiment of the present disclosure further provides a computer program product comprising a computer program/instructions which, when being executed by a processor, implement the video processing method as set forth in the embodiment of the present disclosure.

Figure 6:
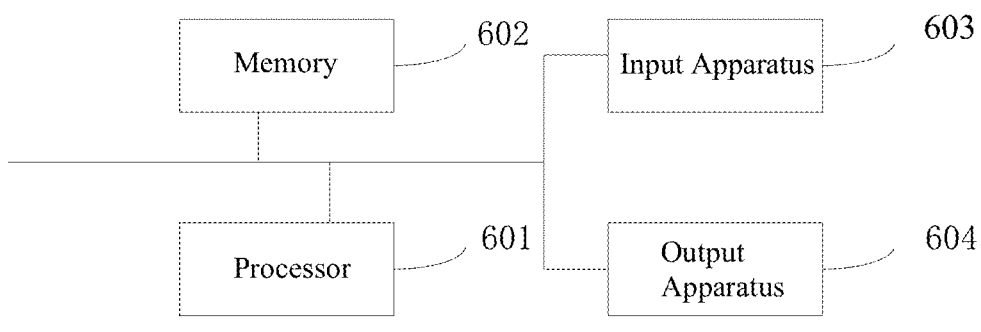
FIG. 6 is a schematic structural diagram of a video processing device as provided in an embodiment of the present disclosure.

In addition, the embodiment of the present disclosure further provides a video processing device, as shown in FIG. 6, which can include:

a processor 601, a memory 602, an input apparatus 603, and an output apparatus 604. The number of processors 601 in the video processing device can be one or more, and one processor is taken as an example in FIG. 6. In some embodiments of the present disclosure, the processor 601, the memory 602, the input apparatus 603 and the output apparatus 604 can be connected via a bus or other means, wherein the connection by the bus is taken as an example in FIG. 6.

The memory 602 can be used for storing software programs and modules, and the processor 601 executes various functional applications and data processing of the video processing device by executing the software programs and modules stored in the memory 602. The memory 602 can mainly include a program storage area and a data storage area, wherein the program storage area can store an operating system, an application program required for at least one function, and the like. In addition, the memory 602 can include a high speed random access memory, as well as a non-volatile storage, such as at least one magnetic disk storage device, a flash memory device, or other volatile solid state storage device. The input apparatus 603 can be used for receiving input digital or character information and generating signal inputs relating to user settings and function control of the video processing device.

Specifically, in this embodiment, the processor 601 will load an executable file corresponding to a process of one or more application programs onto the memory 602 according to the following instructions, and the processor 601 operates the application programs stored in the memory 602, thereby realizing various functions of the above-mentioned video processing device.

It should be noted that, relational terms herein such as "first", "second" and the like, are used merely to distinguish one entity or operation from another entity or operation without having to require or imply presence of any actual such relationship or order between such entities or operations. Also, the terms "comprise", "include" or any other variation thereof, are intended to cover a non-exclusive inclusion, such that a process, method, article, or device that comprises a series of elements not only includes those elements but also includes other elements not expressly listed or elements inherent to such process, method, article, or device. Without further limitation, an element defined by the phrase "comprising a . . . " does not exclude the presence of other identical elements in the process, method, article, or device that comprises the element.

The above is only for the purpose of describing particular embodiments of the present disclosure, so as to enable those skilled in the art to understand or implement the present disclosure. Various modifications to these embodiments will be obvious for those skilled in the art, and the generic principles defined herein can be implemented in other embodiments without departing from the spirit or scope of the present disclosure. Thus, the present disclosure is not intended to be limited to the embodiments set forth herein but is to comply with the broadest scope consistent with the principles and novel features disclosed herein.

What is claimed is:

1. A video processing method, comprising: displaying a preset video switching control on a video playing page for a target video during playing a first video information stream, wherein the target video belongs to a first video collection and the first video information stream, the first video information stream includes the target video and a first plurality of videos in a first playing order, and the first plurality of videos are different from videos in the first video collection; determining a target switching video from the first video collection based on a trigger operation for the preset video switching control; inserting the target switching video into a position in the first video information stream where the target video is located and deleting the target video to obtain an updated first video information stream including the target switching video and the first plurality of videos in the first playing order; playing the target switching video on the video playing page based on the updated first video information stream, wherein videos in the updated first video information stream are able to be switched through a preset slide operation triggered on the video playing page; in response to a preset switch-back operation for the target switching video, determining a previous video adjacent to the target switching video in the first plurality of videos of the updated first video information stream according to the first playing order as a target switch-back video; and playing the target switch-back video on the video playing page.

2. The method according to claim 1, the preset video switching control including a next episode switching control, the determining a target switching video from the first video collection based on a trigger operation for the preset video switching control including:
in response to a trigger operation for the next episode switching control, determining a next video adjacent to the target video in the first video collection as the target switching video.

3. The method according to claim 1, the preset video switching control including an episode selection switching control, the determining a target switching video from the first video collection based on a trigger operation for the preset video switching control including: in response to a trigger operation for the episode selection switching control, displaying a video list corresponding to the first video collection on the video playing page, wherein the video list is used for presenting information of videos in the first video collection based on a playing order; and in response to a trigger operation for any video in the video list, determining a video corresponding to the trigger operation as the target switching video.

4. The method according to claim 1, after the playing the target switching video on the video playing page based on the updated first video information stream, the method further including: in response to a preset switch-forward operation for the target switching video, determining a next video adjacent to the target switching video in the updated first video information stream as a target switch-forward video; and playing the target switch-forward video on the video playing page.

5. The method according to claim 1, before the displaying a preset video switching control on a video playing page for a target video, the method further comprising: in response to a preload trigger operation for the first video information stream, preloading videos in the first video collection, to which the target video in the first video information stream belongs.

6. A non-transitory computer readable storage medium having stored therein instructions which, when being executed on a terminal device, cause the terminal device to implement a video processing method comprising: displaying a preset video switching control on a video playing page for a target video during playing a first video information stream, wherein the target video belongs to a first video collection and the first video information stream, the first video information stream includes the target video and a first plurality of videos in a first playing order, and the first plurality of videos are different from videos in the first video collection determining a target switching video from the first video collection based on a trigger operation for the preset video switching control; inserting the target switching video into a position in the first video information stream where the target video is located and deleting the target video to obtain an updated first video information stream including the target switching video and the first plurality of videos in the first playing order; playing the target switching video on the video playing page based on the updated first video information stream, wherein videos in the updated first video information stream are able to be switched through a preset slide operation triggered on the video playing page; in response to a preset switch-back operation for the target switching video, determining a previous video adjacent to the target switching video in the first plurality of videos of the updated first video information stream according to the first playing order as a target switch-back video; and playing the target switch-back video on the video playing page.

7. The non-transitory computer readable storage medium according to claim 6, the preset video switching control including a next episode switching control, the determining a target switching video from the first video collection based on a trigger operation for the preset video switching control including: in response to a trigger operation for the next episode switching control, determining a next video adjacent to the target video in the first video collection as the target switching video.

8. The non-transitory computer readable storage medium according to claim 6, the preset video switching control including an episode selection switching control, the determining a target switching video from the first video collection based on a trigger operation for the preset video switching control including: in response to a trigger operation for the episode selection switching control, displaying a video list corresponding to the first video collection on the video playing page, wherein the video list is used for presenting information of videos in the first video collection based on a playing order; and in response to a trigger operation for any video in the video list, determining a video corresponding to the trigger operation as the target switching video.

9. The non-transitory computer readable storage medium according to claim 6, after the playing the target switching video on the video playing page based on the updated first video information stream, the method further including: in response to a preset switch-forward operation for the target switching video, determining a next video adjacent to the target switching video in the updated first video information stream as a target switch-forward video; and playing the target switch-forward video on the video playing page.

10. The non-transitory computer readable storage medium according to claim 6, before the displaying a preset video switching control on a video playing page for a target video, the method further comprising: in response to a preload trigger operation for the first video information stream, preloading videos in the first video collection, to which the target video in the first video information stream belongs.

11. A video processing device, comprising: a memory, a processor, and a computer program stored on the memory and executable on the processor, the processor implementing a video processing method comprising: displaying a preset video switching control on a video playing page for a target video during playing a first video information stream, wherein the target video belongs to a first video collection and the first video information stream, the first video information stream includes the target video and a first plurality of videos in a first playing order, and the first plurality of videos are different from videos in the first video collection determining a target switching video from the first video collection based on a trigger operation for the preset video switching control; inserting the target switching video into a position in the first video information stream where the target video is located and deleting the target video to obtain an updated first video information stream including the target switching video and the first plurality of videos in the first playing order; playing the target switching video on the video playing page based on the updated first video information stream, wherein videos in the updated first video information stream are able to be switched through a preset slide operation triggered on the video playing page; in response to a preset switch-back operation for the target switching video, determining a previous video adjacent to the target switching video in the first plurality of videos of the updated first video information stream according to the first playing order as a target switch-back video; and playing the target switch-back video on the video playing page.

12. The video processing device according to claim 11, the preset video switching control including a next episode switching control, the determining a target switching video from the first video collection based on a trigger operation for the preset video switching control including: in response to a trigger operation for the next episode switching control, determining a next video adjacent to the target video in the first video collection as the target switching video.

13. The video processing device according to claim 11, the preset video switching control including an episode selection switching control, the determining a target switching video from the first video collection based on a trigger operation for the preset video switching control including: in response to a trigger operation for the episode selection switching control, displaying a video list corresponding to the first video collection on the video playing page, wherein the video list is used for presenting information of videos in the first video collection based on a playing order; and in response to a trigger operation for any video in the video list, determining a video corresponding to the trigger operation as the target switching video.

14. The video processing device according to claim 11, after the playing the target switching video on the video playing page based on the updated first video information stream, the method further including: in response to a preset switch-forward operation for the target switching video, determining a next video adjacent to the target switching video in the updated first video information stream as a target switch-forward video; and playing the target switch-forward video on the video playing page.

15. The video processing device according to claim 11, before the displaying a preset video switching control on a video playing page for a target video, the method further comprising: in response to a preload trigger operation for the first video information stream, preloading videos in the first video collection, to which the target video in the first video information stream belongs.

* * * * *